(12) United States Patent
Burger et al.

(10) Patent No.: US 7,548,905 B2
(45) Date of Patent: Jun. 16, 2009

(54) REFRESHING AN EXECUTION PLAN FOR A QUERY

(75) Inventors: Louis Burger, Eseondido, CA (US); Thomas Julien, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 132 days.

(21) Appl. No.: 11/554,077

(22) Filed: Oct. 30, 2006

(65) Prior Publication Data

US 2008/0104014 A1  May 1, 2008

(51) Int. Cl.
*G06F 7/00* (2006.01)
*G06F 17/30* (2006.01)
(52) U.S. Cl. .............................................. 707/2; 707/6
(58) Field of Classification Search .................. 707/100, 707/102, 201, 1–6
See application file for complete search history.

(56) References Cited

U.S. PATENT DOCUMENTS 6,529,901 B1 *  3/2003  Chaudhuri et al. ............. 707/3
2004/0220923 A1 * 11/2004  Nica ............................... 707/3
2007/0192296 A1 *  8/2007  Burger et al. .................. 707/3
2007/0208695 A1 *  9/2007  Burger et al. .................. 707/2
2008/0052266 A1 *  2/2008  Goldstein et al. .............. 707/2
2008/0189243 A1 *  8/2008  Li et al. .......................... 707/2
2008/0215531 A1 *  9/2008  Markl et al. .................... 707/2

* cited by examiner

*Primary Examiner*—Don Wong
*Assistant Examiner*—Merilyn P Nguyen
(74) *Attorney, Agent, or Firm*—Griffith Hack

(57) ABSTRACT

An improved system and method for storing, reusing and recompiling execution plans for SQL database queries. The system. The system validates the performance of a newly compiled plan prior to replacing a currently stored execution plan and compares the resource cost of the recompiled plan with the cost of the currently stored plan. In the event that the resource cost of the recompiled plan is not greater than the stored plan resource cost, the system replaces the currently stored execution plan with the recompiled plan.

4 Claims, 2 Drawing Sheets

REFRESHING AN EXECUTION PLAN FOR A QUERY

FIELD OF THE INVENTION

The present invention relates to execution of queries of a relational database.

BACKGROUND

Relational database systems store tables of data which are typically linked together by relationships that simplify the storage of data and make queries of the data more efficient. Structured Query Language (SQL) is a standardized language for creating and operating on relational databases.

Many relational database systems have the capability to save a compiled execution plan for a SQL query and to re-use the saved plan for subsequent execution of the same query. Storing the compiled execution plan saves the CPU cost of having to repeatedly parse and optimize frequently executed queries. This feature can be used to ensure consistent query performance. Relational database system typically includes an optimizer that plans the execution of SQL queries. The optimizer's chosen plan for a given query can change as data characteristics change or the optimizer's software itself changes. In turn, varying the execution plan can increase the likelihood of an inefficient plan being chosen and resulting performance regression. Consistently using the same stored execution plan minimizes the risk associated with varying plans by locking in the desired execution plan.

Over time however, stored execution plans eventually becomes sub-optimal (often termed stale) as system characteristics change. The most common reasons for a plan becoming sub-optimal are:

new indexes for updated statistics become available;
  a newer version of the query optimizer software is installed which contains new optimization techniques; and
  the computer hardware on which the query is running is changed.

It is also known for an optimizer to fail to choose the best available plan, sometimes as a result of a defect in the optimizer's code or sometimes due to limitations of the technology employed in the optimizer.

Sophisticated query optimizer's take into account how the specification of the system's CPU, disks, network interconnect, and data cache size when estimating cost or alternative plans. Typically a stored set of configurable "cost parameters" in the data dictionary will be stored in the data dictionary that represent either; the cost of performing well defined low level operations (for example, cost to read one block from a disk), or the configured size of a resource (for example data cache size). These cost parameters are used by the optimizer's formulae to estimate the total cost for varies execution methods (for example file scan, sort, nested loop, join etc). When a system's hardware is changed the optimizer's cost parameters are also changed accordingly. Changes to the hardware configuration can produce a change in the actual resource cost, which may or may not be reflected properly in optimizer's estimation of the resources necessary to execute a particular query.

To allow refreshing of sub-optimal plans, most vendors provide a "with recompile" SQL syntax option, that will manually force the query to be recompile upon execution. More advanced systems may even support automatic recompiles based on built in rules that detect when plans become sub-optimal.

A serious danger in recompiling stored execution plans is that there is no guarantee that the performance of the new plan is better than the current stored one and it can be worse, in which case it may not be possible to revert to the old execution plan.

SUMMARY OF THE INVENTION

According to one aspect of the present invention there is a method of refreshing a stored execution plan for a database query where the stored execution plan comprises a compiled form of the query, the stored execution plan having a stored plan resource cost associated therewith, said method comprising:
  compiling the database query;
  executing the compiled query;
  determining the actual resource cost of the execution of the compiled query;
  comparing the determined resource cost of the compiled query with the stored plan resource cost; and
  in the event that the determined cost is not worse than the stored plan resource cost, replacing the stored execution plan with the compiled query.

In an embodiment the actual resource cost is stored in association with the compiled query.

In an embodiment, in the event that the determined cost is worse than the stored plan resource cost, then the compiled query is discarded.

According to another aspect of the present invention, there is a database system arranged to refresh a stored execution plan for a database query, where the stored execution plan comprises a compiled form of the query, said system comprising:
  a storage device for storing the execution plan and a stored plan resource cost associated therewith;
  a compiler for compiling the query;
  a query executor for executing the compiled query;
  a resource cost determiner for determining the actual resource cost of execution of the compiled query; and
  a comparator for comparing the determined resource cost of the compiled query with the stored plan resource cost, wherein in the event that the determined resource cost is not worse than the stored plan resource cost, the comparator is arranged to cause the stored execution plan in the storage to be replaced with the compiled query.

In another aspect of the present invention there is a computer program stored on a computer readable medium for refreshing an execution plan for a database query, where the stored execution plan comprises a compiled form of the query, said computer program comprising instructions to cause a computer processor to:
  compile the query;
  execute the compiled query;
  determine the actual resource cost of execution of the compiled query;
  compare the determine resource cost of the compiled query with a stored plan resource cost; and
  in the event that the determined resource cost is not worse than the stored plan resource cost, replace the stored execution plan with the compiled query.

DETAILED DESCRIPTION

Figure 1:
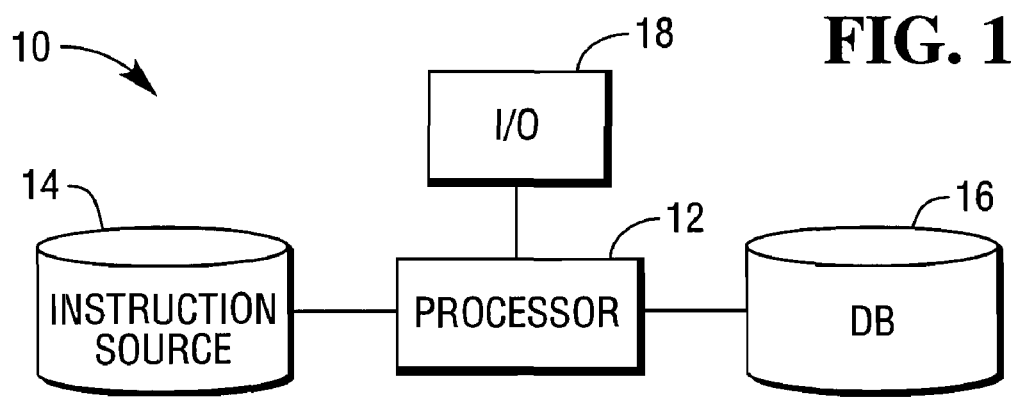
FIG. 1 is a block diagram of a database system.

Referring to FIG. 1, a schematic representation of a database system 10 is shown, which includes a microprocessor 12, a source of instructions 14, a database 16 and I/O 18. The source of instructions 14 and the database 16 may be stored in the same or separate storage devices, which may include random access memory, hard disk drive(s) or some other suitable storage means. These storage devices may be local or may be located over a network. The microprocessor 12 may be a single processing unit or a plurality of processing units. The I/O 18 typically includes human input devices and/or one or more displays and may also include a network interface.

The microprocessor 12 operates under the control of at least one database product computer program to as to implement the database system 10. The computer program is stored on a computer readable medium, such as a diskette, compact disk or digital versatile disk, and is loaded onto the computer's storage device so as to execute when called.

Instructions in the form of SQL statements are provided from the instruction source 14 to the microprocessor 12 and are used by the microprocessor 12 to create and store the database 16 and/or modify the database 16 and/or retrieve information from the database 16 all under the control of the database product computer program. Data may be entered via the I/O 18 or maybe provided as an output by I/O 18.

A standard SQL feature is a stored procedure, which is where a collection of SQL statements are associated with a named identifier and saved in a dictionary. Due to the SQL statements being associated with the named identifier, it is straight forward to store and retrieve an associated execution plan. Hence, user specified features related to storing and recompiling execution plans are often implemented as part of stored procedures.

An example SQL syntax for creating a storage procedure is listed below. Elements listed within [ ] are optional.

```
CREATE PROCEDURE <stored_procedure_name> AS
<sql_statements> [SAVE PLAN]
```

If the SAVE PLAN clause is included, the compiled execution plan for the sql_statments is also stored in the dictionary.

An example SQL syntax for executing a stored procedure and optionally forcing a recompilation of the stored procedure is below;

EXECUTE <stored_procedure_name> [WITH RECOMPILE]

It is noted that the above syntax is only a representative example of SQL statements that create and store procedures. The syntax for such commands may vary from one database product to another.

In one embodiment of the present invention storage of new plans is delayed until after their execution, and replacement of old stored plans with newly recompiled plans occurs only in those cases where the actual execution cost has not degraded.

An example SQL syntax for stored procedure execution includes an optional clause that invokes a new validation feature according to the present invention and is set out below;

```
EXECUTE <stored_procedure_name> [ WITH [VALIDATED]
RECOMPILE ]
```

A run-time performance monitor is implemented by the microprocessor 12 under the control of the database product computer program that records the actual cost of SQL statements executed in the database system 10. The "cost" can be represented as either elapsed time or system resources consumed, such as CPU seconds or disk I/O's. This resource cost is distinguished from an estimated cost provided by a query optimizer.

An algorithm, described further below, handles recompilation during execution of a stored procedure. When validation mode is called by use of the VALIDATED clause, the algorithm compares the actual cost of the recompiled plan with a cost of the currently stored plan. It is noted that such costs can fluctuate in a multi-user system, however minor fluctuations are not likely to impact the effectiveness of the algorithm because of the overriding goal of the algorithm is to detect and avoid significant performance regressions.

The historical cost recorded in relation to a given plan is also associated with a specific hardware configuration on which it is run. If the underlying hardware (as recorded by cost parameters) changes, the recorded cost of the storage plan should be updated to reflect the time or resources needed to run it on the new hardware. Doing so, ensures that a fair comparison is made between a stored plan and a subsequent recompiled plan.

Pseudo Code for handling a recompilation is given below.

```
Search the dictionary for a stored plan for the specified
<stored_procedure_name>
    If plan is found
        StoredPlan = true
    Else
        StoredPlan = false
    If StoredPlan AND NOT "With Recompile"
        Execute the plan fetched from dictionary
    Else If NOT StoredPlan /* there is no stored plan */
        Compile the <sql_statments> in the body of the stored
        procedure
        Execute the plan and record the actual costs
        Store plan in dictionary
        Save actual costs in stored plan
        Save current hardware cost parameters in the stored plan
    Else /* StoredPlan AND "With Recompile" */
        Compile the <sql_statments> in the body of the stored
        procedure
        Execute the new recompiled plan and record the actual costs
        If "Validated"
            If current cost parameters are not identical to stored plan
cost parameters
                Execute existing stored plan and record the actual
costs
                Update actual costs in stored plan
                Save current hardware cost parameters in stored
plan
            If new recompiled plan costs <= stored plan costs
                Replace old stored plan with new recompiled plan
                Save new actual costs in stored plan
            Else
                Discard new recompiled plan without saving it
        Else /* NOT "Validated" */
            Replace old stored plan with new plan
            Save new actual costs in stored plan
            Save current hardware cost parameters in stored plan
```

Figure 2:
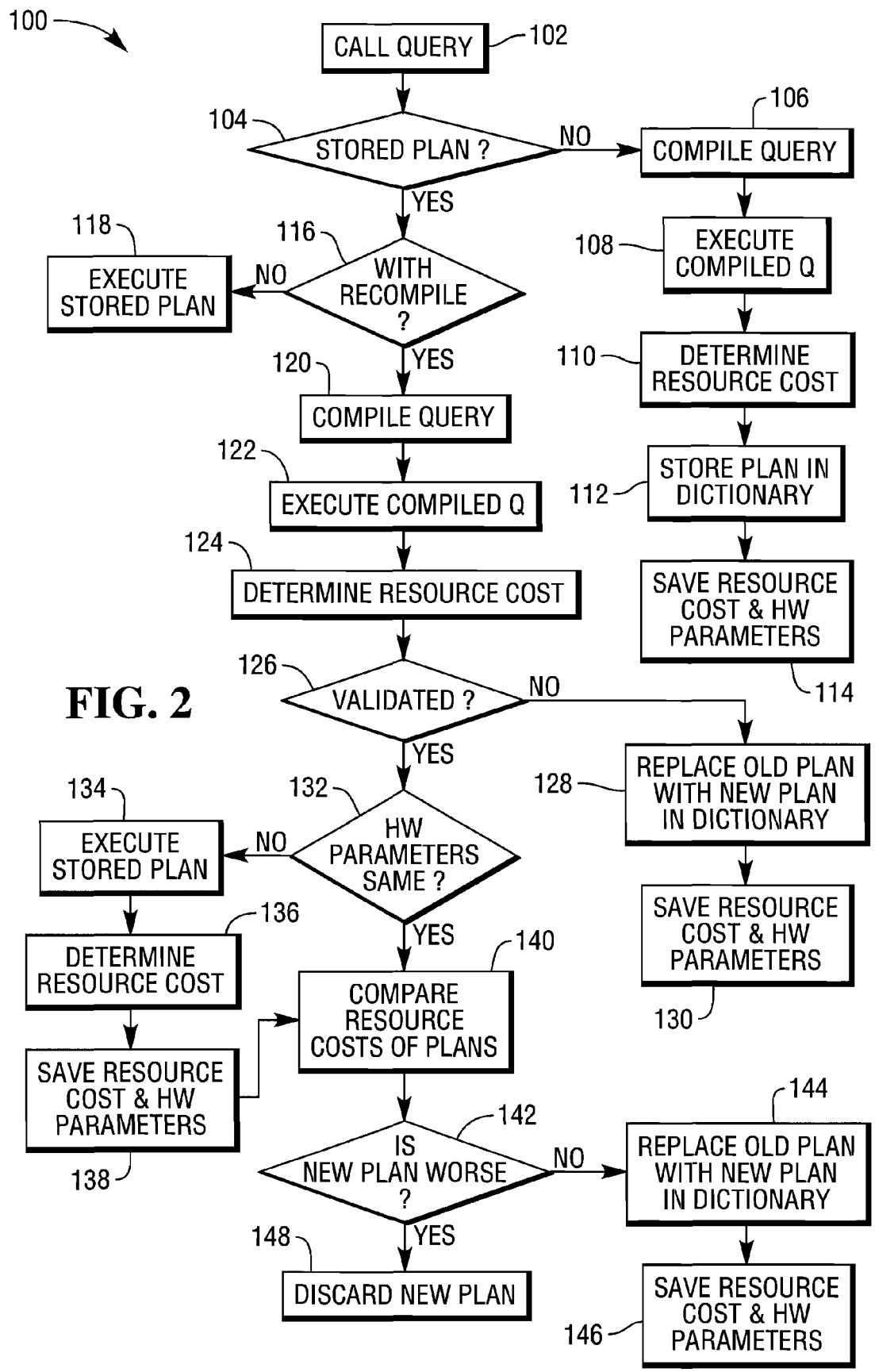
FIG. 2 is a flow chart of one embodiment of a method of refreshing an execution plan for a query according to the present invention.

The operation of this pseudo code is explained with reference to the method 100 shown in FIG. 2. The process commences when a query is called such as the execution of a named procedure at 102. A check is performed at 104 to determine whether there is a stored plan for the query being called. If there is no stored plan then the query is compiled at 106. The compiled query is executed at 108. The resource cost to execute the compiled query is determined at 110. The compiled query is stored at 112 as an execution plan in the dictionary for the use when next the query is called. The determined resource cost and hardware parameters are stored at 112 in association with the executed plan. The process ends at this point.

In the event that there is a stored plan for the called query, a determination is made at 116 whether the query has been called with a recompile. The query will have been called with recompile if the optional clause "WITH RECOMPILE" is included in the procedure. If there is no recompile included in the procedure statement, the stored plan is executed at 118. The process then ends at this point.

In the event that the executed statement includes the WITH RECOMPILE option, then at 120 the query is recompiled at 120 and then executed at 122. The cost to execute the recompiled query is determined at 124.

It is then determined whether the procedure statement includes the optional clause VALIDATED at 126. If the recompiled query is not to be VALIDATED, then at 128 the old plan is replaced with the new plan in the dictionary and the resource cost of executing the recompiled query along with the hardware parameters are saved at 130. The process then ends at this point.

In the event that the recompiled query is to be validated, then at 132 it is determined whether the hardware parameters are the same. In the event that the hardware parameters are not the same, then the stored plan is executed at 134 (under the new hardware parameters). The resource cost to execute the stored plan under the new hardware parameters is determined at 136 and the determined resource cost and hardware parameters are saved at 138 with the stored plan. A comparison is made between the resource cost to execute the stored plan and the resource cost to execute the recompiled plan at 140. In the event that the hardware parameters are the same, then jumps straight to this comparison at 140.

It is then determined at 142 whether the new plan is worse in resource costs than the stored execution plan. In the event that it is the same or better (i.e. that is not worse) then at 144 the old plan is replaced with the new compiled plan within the dictionary at 144. The resource cost of the newly compiled plan and hardware parameters are stored at 146. The process ends at this point.

In the event that the new execution plan is worse in resource costs than the stored plan, then at 148 the new plan is discarded and the stored plan is retained.

The present invention preserves all of the existing functionality associated with recompiling stored execution plans while also adding new safeguards to prevent performance regressions. In addition, the decision making algorithm relies on actual run time costs which are much more accurate than similar estimations made at parse or compile time. In addition the record execution costs are directly dependant on hardware capabilities and hence must be accounted for when comparing the costs of new plans with existing ones.

It will be understood to persons skilled in the art of the invention that many modifications may be made without departing from the spirit and scope of the invention.

The invention claimed is:

1. A method of refreshing a stored execution plan for a database query where the stored execution plan comprises a compiled form of the query, the stored execution plan having a stored plan resource cost associated therewith, said method comprising:
   compiling the database query;
   executing the compiled query;
   determining the actual resource cost of the execution of the compiled query;
   comparing the determined resource cost of the compiled query with the stored plan resource cost; and
   in the event that the determined cost is not worse than the stored plan resource cost, replacing the stored execution plan with the compiled query.

2. A method as claimed in claim 1, wherein the actual resource cost is stored in association with the compiled query.

3. A method as claimed in claim 1, wherein in the event that the determined cost is worse than the stored plan resource cost then the compiled query is discarded.

4. A computer program stored on a computer readable medium for refreshing an execution plan for a database query, where the stored execution plan comprises a compiled form of the query, said computer program comprising instructions to cause a computer processor to:
   compile the query;
   execute the compiled query;
   determine the actual resource cost of execution of the compiled query;
   compare the determine resource cost of the compiled query with a stored plan resource cost; and
   in the event that the determined resource cost is not worse than the stored plan resource cost, replace the stored execution plan with the compiled query.

* * * * *